Oct. 13, 1953   C. M. ZVANUT   2,655,550
MELTING FURNACE WITH THERMOCOUPLE RECEPTION MEANS
Filed May 29, 1951
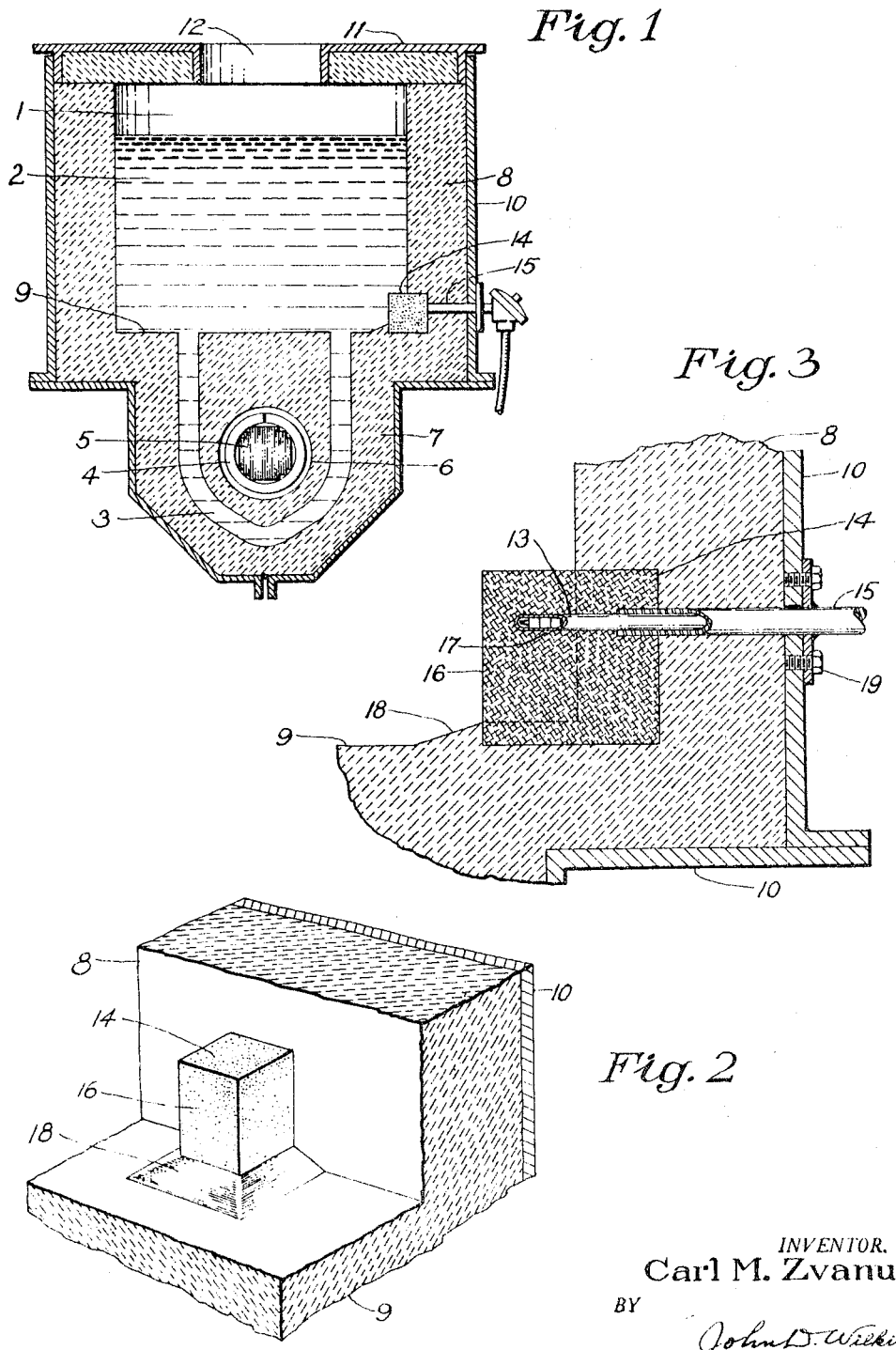
INVENTOR.
Carl M. Zvanut
BY
John D. Wilkins
AGENT Patented Oct. 13, 1953

2,655,550

UNITED STATES PATENT OFFICE 2,655,550

MELTING FURNACE WITH THERMOCOUPLE RECEPTION MEANS

Carl M. Zvanut, Alton, Ill., assignor to Olin Industries, Inc., East Alton, Ill., a corporation of Delaware Application May 29, 1951, Serial No. 228,904

13 Claims. (Cl. 13—24)

This invention relates to metallurgical apparatus and more particularly to a metal melting furnace having as a permanent part thereof improved means capable of continuously detecting and measuring the temperature of the bath of molten metal contained therein.

In the melting of metals, it is important that the temperature of the bath in the hearth or crucible portion of the furnace be obtained with reasonable accuracy and be ascertainable at any period during which raw metal is being charged into the furnace and during which the bath is being brought up to the requisite degree of temperature for pouring into casting molds. As is well known, the thermocouple is one of the most satisfactory devices for measuring the high temperatures encountered in metal melting, chiefly because of the apparent simplicity of such devices and high degree of accuracy obtainable with them; but since the thermocouple cannot itself be directly immersed into the molten metal it must be provided with a protective enclosure. Provision of a satisfactory enclosure is the chief difficulty in adaptation of thermocouples to measurement of molten metal temperatures. Because of the chemical attack and physical deteriorations which are likely to occur, the enclosure must be of a suitable composition and form to reasonably withstand such attack and deterioration. At the same time the protective enclosure must not be of such a ponderous construction or unsuitable composition as to interfere with the ready transmission of heat from the bath to the temperature responsive thermocouple thereby causing an undesirable lag in response and sensitivity. Furthermore, dissolution of the enclosure must not result in contamination of the metal of the bath. Because of the rigorous conditions encountered most materials wear rapidly and must be replaced often or are entirely unsatisfactory for various reasons.

Heretofore, in recognition of materials limitations and in resignation to the apparent unavoidability of frequent replacement, the measurement of molten metal temperature has in practice been generally accomplished with the use of a portable thermocouple immersion unit adaptable to be projected downwardly through the surface of the metal bath for a reading and then withdrawn to be discarded as an expendable item or reserved for further intermittent use until the materials of the unit are in need of replacement. One obvious disadvantage of these portable devices is the requirement of skilled personnel and expenditure of time to handle, supervise, and rebuild them. Another disadvantage is the delay occasioned by the temperature probing operation and interference with the raw metal charging and casting operations. Another is the danger of damage to the unit in transit rendering it inoperable or, which is more serious, causing it to give off-calibration readings. Consequently, constant and expensive maintenance and testing is usually associated with such units. Another disadvantage attendant with the use of a portable thermocouple is the difficulty of avoiding variations in depth and time of immersion and in the condition of the metal surface and the temperatures and atmospheres to be found in the furnace chamber space over the bath, any of which variations may introduce serious errors.

Attempts have been made to provide a unit of a somewhat more permanent nature to avoid the aforementioned disadvantages. One such scheme involves the use of a removable plug, carrying the thermocouple unit disposed in the recessed channels of the submerged resistor heating unit located below the main body of metal of the bath to avoid damage from impact with freshly charged solid metal or tools utilized in stirring the bath and servicing the furnace. A disadvantage of this installation is that the thermocouple is subjected to a stream of metal far hotter than the main body of metal in the crucible of the furnace. Furthermore, in view of the tremendous hydrostatic pressures encountered with molten metals, this installation suffers from the further disadvantage and danger that the plug may be blown out, since it is located not only at the place of greatest hydrostatic pressure but also at a place where "pinch effect" in the channel often applies the pressure with impact; and the escaping molten metal may endanger the lives of the operators of the furnace. Still another scheme involves provision of a downwardly extending recess, i. e., well or side arm, in the furnace wall into which there extends both the pyrometer unit and a small fraction of the bath. The main object of this scheme is to prevent escape of the entire bath while the pyrometer unit is being replaced or immediately on failure of the unit. It is apparent that this installation will respond not to the temperature of the main body of metal but to the temperature of the stagnant pool of metal extending into the recess, which as a rule will be lower than the temperature of the bath. It is obvious that such installations while aiming at a long useful life are actually designed for replacement because they are subject to failure during the life of the furnace.

Although the introduction of a temperature responsive unit through the furnace wall in a position well below the molten metal bath level and into intimate contact with the main body of the bath as a permanent installation may be recognized to be a desideratum, the achievement thereof is a difficult problem. To be satisfactory, a permanent temperature responsive installation must not be exposed to breakage and injury from charging metal, it must be adequately exposed to the main body of the metal and not to a mere appendage thereof, and it must be of such a combination of materials and construction as to have a life commensurate with that of the furnace of which it is to form a part.

The main object of the present invention is the achievement of the aforementioned desideratum of associating with a melting furnace a protectively enclosed thermocouple unit capable of remaining an operative part of the furnace during its entire useful life.

Another object of the invention is to provide apparatus for melting metals and at the same time ascertaining the temperature of the metal at any or all times during the melting operation without resort to the use of auxiliary temperature measuring device.

Another object is to provide a metal melting furnace having a novel disposition and construction of the means associated therewith for accurately measuring the operating temperature of the bath of molten metal.

Still another object is to provide an improved submerged resistor channel type of electric induction metal melting furnace having a novel thermocouple installation adapted for permanent association therewith.

A further object of the invention is to provide a protectively enclosed high temperature responsive unit as a permanent part of a furnace for melting non-ferrous metals such as brass and bronze.

A still further object of this invention is to associate with a metal melting furnace a temperature responsive unit free of the aforementioned disadvantages of prior art devices.

In accordance with the present invention there is provided in association a metal melting furnace and a thermocouple unit extending into the main body of the molten metal, both the unit and the furnace having a useful life of the same order of duration, that of the unit being not less than that of the furnace. Briefly, the invention comprises providing a thermocouple unit having an outer protective enclosure or closed-end tube of a suitable heat conductive refractory material proportioned in dimensions to give a separating wall of the enclosure material between the molten metal and the thermocouple well in the enclosure adequate to endure the attack and to withstand the force encountered and securing such an enclosure in a particular location and manner in the lining of the crucible of the metal melting furnace. Specifically, in the melting of various copper base alloys such as brass and bronze in an electric induction furnace of the submerged resistor channel type, it has been found that, if, instead of seeking as an outer thermocouple enclosure in direct contact with the molten metal some kind of a refractory material having exceptional properties such as high strength and nearly absolute resistance to erosion, a hollow block of graphite is proportioned and placed within a melting furnace in a particular way, the objectives set forth hereinbefore may be achieved provided the molten metal is maintained substantially free of the cuprous oxide phase and any materials such as nickel which attack graphite. Accordingly, there is secured in an optimum location in the lowermost portion of the crucible of a suitable metal melting apparatus in the manner hereinafter described a hollow or recessed graphite block having a wall thickness about the recess preferably not less than about one inch but not more than about five inches. Although graphite is susceptible to attack by oxygen in molten metal in various degrees, in certain copper base alloys, particularly brass and bronze and the like, the rate of attack on graphite has been found to be sufficiently low under circumstances encountered in the melting apparatus, making it possible to fashion in accordance with this invention a thermocouple enclosure of graphite which will last even longer than the melting apparatus customarily used in the melting of these alloys. In the accompanying drawing, showing a preferred embodiment of the invention:

Fig. 1 is an elevational view in cross-section of my installation in a melting furnace of the type commonly employed in the melting of non-ferrous metals such as brass, Fig. 2 is an enlarged fragmentary view in perspective and partly in cross-section taken from within the furnace showing part of the floor and base of the side wall of the furnace crucible and the part of the thermocouple installation protruding from the side wall along the floor of the crucible, and Fig. 3 is a cross-sectional view of the thermocouple installation taken on a vertical midsection of Fig. 2 showing the manner of assembly and placement with respect to the lining of the crucible.

The metal melting furnace shown in Fig. 1 is of the type disclosed in U. S. Patent 1,201,671 and comprises a crucible 1 for holding the bulk of the molten metal bath 2 and depending therefrom a molten metal loop 3 forming the resistance heating unit and transformer secondary coupled with the primary coil 4 wound about leg 5 of the iron transformer core extending through the passage-way 6 formed in the lowermost portion 7 of the furnace. The crucible 1, which is commonly capable of holding as high as 4,000 pounds of metal, is generally in the form of a cylinder having a vertical side wall 8 and flat floor 9 pierced only by the openings of the molten metal loop 3 depending from the crucible 1. The side wall 8 and the floor 9 of the crucible are usually formed in situ by ramming a suitable refractory ceramic material such a mullite as a lining within the outer metal shell 10 encasing the furnace. This liner serves as a container and refractory heat insulator for the bath. To further reduce the heat loss, the furnace is usually provided with a refractory lined cover 11 having a charging opening 12 for admission of raw metal to the bath. The molten metal in the crucible is both heated and agitated by the streams of hot metal issuing from the channel openings of the loop 3.

The thermocouple unit, Fig. 3, consists of the usual platinum and platinum-rhodium thermocouple pair strung through a plurality of segments of a double bored insulator in the conventional manner, a thin walled porcelain thermocouple enclosure or tube 13, a rectangular hollow block 14 of graphite embedded in the interior surface of the crucible 1, and a steel conduit 15 to sheath and carry the thermocouple pair and porcelain tube 13 through that part of the side wall 8 of crucible 1 between the block 14 and that part of the outer metal furnace shell 10 through which the steel conduit 15 forms a passage-way and to which the conduit is fastened in any suitable manner. The thermocouple pair is encased within the porcelain tube 13 which in turn passes first through the steel conduit 15 and then into a recess in the graphite block 14 where the porcelain tube 13 in intimate contact with the interior walls of the recess serves, first, to protect the material of the cavitated block from atmospheric attack from within, second, to shield the thermocouple wires from gas evolved by block 14, and also serves to electrically insulate the hot junction of the thermocouple pair from the graphite block without appreciable interference with heat transmission to the junction. To obtain the desired intimacy of contact between porcelain tube 13 and graphite block 14, any space occurring between them is filled with graphite cement 17. If any space is permitted between tube 13 and block 14 not only will it impair the heat transmission to the junction of the thermocouple but there is also the danger that stagnant molten metal creeping along the interface between the hot graphite block 14 and the insulating refractory crucible lining will ultimately enter this space to exert hydrostatic pressure on tube 13 and adversely effect the response of the thermocouple and life of the unit.

Of the materials heretofore utilized as outer protective enclosures for thermocouples, including various high temperature metals and alloys such as molybdenum, chromium-nickel steels, and various refractory compositions such as quartz and silica-alumina, a dense body of graphite has been found to be the most suitable material for block 14 when formed and installed in conformity with this invention. Graphite has high heat conductivity; it is refractory, it is resistant to thermal shock; and slag will neither adhere nor form on it, and at high temperatures it has good strength without the brittleness of other materials such as silicon carbine. Furthermore, although subject to limited attack by oxygen in the molten metal in the installation of this invention, block 14 when of graphite will introduce no contamination into a molten bath of copper or that of most of its alloys.

The graphite protective enclosure 14 is in the form of a rectangular block having dimensions 6" x 6" x 3" and is provided with a thermocouple well in the form of a cylindrical recess extending from one of the 3" x 6" faces to pass between and parallel to the broad 6" x 6" faces of the block and terminate short of the front face 16 of the block by about one inch. With the given dimensions, the provision of the thermocouple well having a diameter of about ¾", leaves a wall thickness between the thermocouple well in the block and the surface of the block not less than 1". This minimum dimension provides in this installation for melting brass adequate graphite to endure the attack encountered, leaving at the end of the useful life of the furnace enough residual wall thickness to withstand the hydrostatic pressure of the molten metal and prevent disastrous escape of molten metal. As a safety factor the initial thickness of graphite between the recess and top of block 14 is made about 1½ inches, i. e., somewhat in excess of the minimum permissible thickness, to guard against puncturing of the top in the event that solid metal fall on the block toward the end of the life of the installation when all walls of the block 14 have been considerably reduced in thickness.

By making the block 6 inches in height and by disposing the horizontal thermocouple recess near the top of it, I obtain within block 14 a disposition of the temperature responsive unit upraised from the floor of the crucible by a distance of about 4 inches found to be sufficient to place the unit above the level of slag which will form and collect normally on the refractory floor during the useful life of the furnace and which would "smother" the thermocouple unit, if it were not initially upraised. Furthermore, this form of the graphite enclosure 14 provides for the upraised thermocouple well portion of the block a support depending from the well portion and abutting against the crucible floor 9; and thus there is provided a graphite enclosure 14 protruding from the crucible side wall 8 and also from the crucible floor 9 free of any over hanging portion likely to be broken off when subject to the weight or impact of solid charging metal. An installation wherein the block 14 is embedded flush with the side wall 8 to avoid overhang was found to be unsatisfactory because of an excessive lag between actual and indicated temperatures. Thus, it is essential that block 14 protrude from the crucible lining into the lower part of the bath of molten metal 2 in order that heat be readily transmitted to the hot junction of the thermocouple throughout the melting cycle. In this embodiment graphite block 14 initially protrudes from side wall 8 into the crucible interior by about 3 inches which gives the thermocouple an immersion of about 2 inches into the molten metal bath 2. It is to be understood that with various sizes of furnace crucibles and graphite blocks these dimensions relating to protrusion and immersion will vary accordingly.

Graphite block 14 is partially embedded in the interior of crucible 1 to form a protruding heat conductive part of the crucible lining at a place where adequate contact with the main body of molten metal bath 2 is to be had throughout the melting cycle without undue risk of exposure to destructive blows from freshly charged cathodes, bales or pigs of raw metal particularly at the beginning of the charging and melting cycle when only a shallow pool of metal remains in the crucible. As shown in Fig. 1, block 14 is located at the juncture of the base of the crucible side wall 8 and the floor 9. Block 14 is partially embedded in the side wall 8 and in the floor 9 to derive support from both. In order to better secure the block 14 in the crucible lining, the block is provided with a suitable surface roughening or cross-hatching on that part of it enveloped by the refractory crucible lining which is rammed about the block while the crucible lining is being built up within the furnace shell 10. In effect block 14 is keyed or locked into the crucible lining with positive three dimensional constraint independently of friction and adhesion forces. By supporting and anchoring block 14 in this manner, there is avoided the danger that the block might slip away or be sheared off by the weight and occasional impact with solid metal or be ripped from its moorings by the large buoyant forces encountered. In view of the hydrostatic and buoyant forces to which the block 14 is subjected as the furnace crucible is successively fully charged and poured, leaving only a shallow pool of metal in the bottom of the crucible 1, and in view of the fact that the molten metal creeps between the graphite and refractory material of the crucible lining and gradually erodes the surface of the block, the importance of a dependable method of anchoring block 14 is evident.

It is to be noted that while the graphite block 14 is embedded in the crucible lining and forms only a part of the interior surface of the lining, it does not pass completely through side wall 8. To avoid excessive heat loss and molten metal leakage and to avoid atmospheric attack on the block at high temperatures it is essential that graphite block 14 extend only part of the way from the interior of the crucible through the side wall 8 to the furnace shell 10.

In making a metal melting furnace of the type described in accordance with this invention, the shell 10 of the furnace is first rammed with a crucible floor 9 of a suitable refractory material. Upon this furnace floor is positioned the graphite block 14 is such a way that 3 inches of it back of the front face 16 will extend into the interior of the crucible after the side wall 8 having a thickness of about 8 inches has been rammed into place within the furnace shell 10. Adjacent the bottom of the block 14, crucible floor 9 is built up as a ramp 18 around the lower cross-hatched portion of the graphite block to secure it to the floor. Before side wall 8 is rammed, steel conduit 15 is fastened to furnace shell 10 by any suitable means as bolts 19 to extend between the thermocouple recess in graphite block 14 and the exterior of furnace shell 10. The side wall 8 of the same material as floor 9 is next rammed to completion enveloping conduit 15 and part of the block 14. Thus, graphite block 14 and steel conduit 15 may be considered an integral part of crucible wall 8 rather than part of the thermocouple. Before the installation is considered ready for insertion of porcelain tube 13 and the included platinum and platinum-rhodium thermocouple pair into the bore of steel conduit 15, the recess of graphite block 14 is charged with a graphite cement. On insertion of tube 13 a graphite cement film 17 will take up any space remaining in the recess. Before the metal melting furnace can be put into operation, the entire installation must be preheated in any suitable manner to dry the rammed refractory lining and otherwise prepare it for the reception of a molten metal priming charge. During preheating of the furnace, the protruding portion of graphite block 14 is temporarily provided with a protective cover such as fire brick and any suitable refractory cement. This cover prevents the graphite block from burning up during the preheating period. When preheating of the furnace is completed, the protective cover for block 14 is removed from the crucible 1 which is then primed with molten metal. Finally primary heating coil 4 is connected to the power lines and the thermocouple unit is connected to any suitable temperature indicating and recording unit; after which the entire installation is ready for the melting operation to proceed.

The invention has utility especially in the inductive melting of cuprous metals and alloys such as brass, Phosphor bronze, and leaded brass. By means of the present invention it is possible to ascertain the temperature of the body of the bath of molten metal in the crucible at any time without disruption of melting operations and this may be done until the furnace itself wears out. It is common for an installation made in accordance with this invention to run continuously for 30 or 40 days and even longer during which time about 3,000,000 pounds of metal, more or less, are melted and poured. Furthermore, with a unit of the present invention the response of the thermocouple does not lag excessively behind the rising actual molten metal temperature during heating and the lag ordinarily will not exceed about 50° C. This lag is low considering that when heating of the molten charge is proceeding at a rapid pace the actual temperature rise occurring amounts to a rate of about 1° C. per second and that in practice it is desired that the lag not exceed 75° C. Another advantage of the present installation is that the thermocouple is introduced through the furnace wall below the molten metal bath level without danger of leakage contrary to what might be expected. Furthermore, the furnace operator, by consulting a chart of temperature recordation obtained by means of the unit of this invention, is able to determine not only how soon and often he can charge the furnace with raw metal, thus eliminating loss of time during which the operator hitherto has usually waited to observe the changing conditions of the bath, but also whether the entire bath has come up to the desired temperature at which it is ready for pouring and beyond which it must not be overheated. This invention, therefore, secures advantages desired by the art.

Since many other embodiments within the scope of my invention may occur to those skilled in the art, it is to be understood that the foregoing is intended by way of illustration of a preferred embodiment and not as a limitation of the scope of the present invention except as set forth in the appended claims.

What I claim is:

1. In combination, a metal melting furnace and a high temperature thermocouple reception means, said means comprising a graphite body disposed partly within said furnace and partly embedded in the side wall and floor of said furnace, said graphite body having a recess extending into that portion of said body within said furnace and adapted to receive a thermocouple, said body shielding said thermocouple from the molten metal bath in said furnace.

2. In combination, a metal melting furnace and a high temperature thermocouple reception means, said means comprising a graphite body disposed partly within said furnace and partly embedded in the side wall and floor of said furnace, said graphite body having a recess extending into that portion of said body within said furnace and adapted to receive a thermocouple, said body shielding said thermocouple from the molten metal bath in said furnace by a thickness of graphite within the range from about 1 inch to about 5 inches.

3. In combination in a metal melting furnace, a molten metal bath holding crucible, defined by substantially vertical side walls and a floor, a high temperature thermocouple and thermocouple reception means comprising a hollow graphite body located within said crucible at the juncture of the base of one of said side walls and floor and extending only partly through said crucible wall and floor, said means having a first part embedded in said wall and floor in a manner giving positive three dimensional constraint to said means, a second part protruding without overhang into the molten metal bath, and a thermocouple receiving recess extending completely through the embedded part and partially through the protruding part of said means, in a manner leaving sufficient graphite between said recess and molten metal bath to resist the escape of molten metal for the duration of the useful life of said furnace.

4. In combination in a metal melting furnace, a molten metal bath holding crucible lined with a refractory ceramic heat insulator, high-temperature measuring means, and reception means for said measuring means comprising a hollow graphite body so constructed and arranged at the bottom of the interior of said crucible that one part of the said graphite body is embedded in said crucible lining to provide positive three dimensional constraint for said body with respect to the crucible while the other part of said graphite body protrudes without overhang into the interior of said crucible, said graphite body having in the upper portion thereof connected to the exterior of the crucible and extending into said protruding part of the graphite body a recess initially separated from the molten metal bath of the crucible by sufficient thickness of graphite whereby said reception means constitutes below the level of the molten metal bath a heat transmitting element capable of remaining a barrier against escape of said molten metal bath by way of said recess for the duration of the useful life of the furnace.

5. In combination in a brass melting furnace, a molten metal bath holding crucible, defined by substantially vertical side walls and a floor, a high-temperature thermocouple, and thermocouple reception means comprising a hollow graphite body mounted at the juncture of the base of one of said side walls and the floor of the crucible in such a manner that one part of the said graphite body is embedded in said side wall and floor to provide positive three deminsional constraint for said body with respect to the crucible while the other part of said graphite body protrudes without overhang into the interior of said crucible, said graphite body having connected to the exterior of the crucible and extending into said protruding part of the graphite body a thermocouple receiving recess initially separated from the molten metal bath of the crucible by a thickness of graphite within the range from one to five inches whereby said thermocouple reception means constitutes below the level of the molten metal bath a heat transmitting element capable of remaining a barrier against escape of said molten metal bath for the duration of the useful life of the furnace.

6. In combination in a brass melting furnace, a molten metal bath holding crucible, defined by substantially vertical side walls and a floor, and thermocouple reception means comprising a hollow graphite body mounted at the juncture of the base of one of said side walls and the floor of the crucible in such a manner that one part of the said graphite body is keyed in said side wall and floor to provide positive three dimensional constraint for said body with respect to the crucible while the other part of said graphite body protrudes without overhang into the interior of said crucible, said graphite body having connected to the exterior of the crucible and extending into said protruding part of the graphite body a recess initially separated from the molten metal bath of the crucible by a thickness of graphite of about one inch whereby said thermocouple reception means constitutes below the level of the molten metal bath a heat transmitting element capable of remaining a barrier against escape of said molten metal bath for the duration of the useful life of the furnace.

7. In a metal melting furnace of the submerged resistor channel type having a molten metal bath holding crucible, defined by side walls and a floor formed of a refractory heat insulator, the improvement comprising a body of high conductivity carbonaceous material recessed for receiving a high temperature measuring means and mounted within the crucible in such a manner that one part of said hollow body is keyed in the wall and floor to provide positive three dimensional constraint for said body while the remaining part of said hollow body protrudes into the molten metal bath and receives from said floor support over the entire length of the protruding portion of said hollow body, said recess extending into said protruding portion and initially separated from said molten metal bath by sufficient thickness of material of said hollow body to form a barrier to the escape of molten metal into said recess for the duration of the useful life of the furnace.

8. In a metal melting furnace of the submerged resistor channel type having a molten metal bath holding crucible, defined by side walls and a floor formed of a refractory heat insulator, the improvement comprising a body of graphite recessed for receiving a high temperature thermocouple and mounted within the crucible in such a manner that one part of said hollow body is embedded in the wall and floor to provide positive three dimensional constraint for said body while the remaining part of said hollow body protrudes into the molten metal bath and receives from said floor support over the entire length of the protruding portion of said hollow body, said thermocouple receiving recess extending into said protruding portion and initially separated from said molten metal bath by a thickness of graphite within the range from about 1 inch to about 5 inches to form a barrier to the escape of molten metal into said recess for the duration of the useful life of the furnace.

9. In a molten metal bath holding crucible of a furnace for melting of copper base alloys substantially free of the cuprous oxide phase, the temperature responsive installation comprising: a substantially vertical crucible side wall of refractory heat insulating material; a crucible floor of the same material; a hollow graphite body for reception of a thermocouple and so mounted at the juncture of said floor and the base of said side wall that one part of said graphite body is embedded in the bath floor and wall to key said body three dimensionally with respect to said crucible while the other part of said body, supported by said floor, protrudes without overhanging into the molten metal bath, said body having in the upper part thereof and open to the exterior of the crucible a recess extending substantially horizontally into the protruding portion of said graphite body and initially separated from the molten metal by a thickness of graphite such that after continued operation the residual thickness is adequate to constitute a barrier against escape of molten metal by way of the recess for the duration of the useful life of the furnace, said crucible side wall having a passage-way communicating between the open end of said recess in the graphite block and the exterior of the crucible; a high temperature thermocouple pair encased in a porcelain tube extending through said passageway into the recess in said graphite block; and graphite cement occupying the space remaining between the interior of said recess and said porcelain tube.

10. In a furnace for melting of copper base alloys substantially free of the cuprous oxide phase, the combination comprising a molten metal bath holding crucible, having a side wall and a floor, together with a graphite block having an upper portion recessed for the reception of a thermocouple and a lower supporting portion, said block mounted within the furnace crucible below the molten metal level at the juncture of said side wall and floor in such a manner that said lower portion of the block is embedded in the floor deriving support therefrom and in such a manner that the open end of the recessed portion of the block, communicating with the exterior of the crucible by means of a passageway through the side wall, is embedded in said side wall while the closed-end of the upper recessed portion of the graphite block protrudes from said side wall into the molten metal bath, said recess in the protruding portion of the graphite block being separated from said molten metal by graphite initially not less than one inch in thickness.

11. For the melting of copper base alloys substantially free of the cuprous oxide phase the combination of a melting furnace of the submerged resistor channel type having a molten metal bath holding crucible defined by a substantially vertical side wall and a floor together with thermocouple reception means comprising a hollow graphite body located within the crucible at the juncture of the base of said side wall and floor, said graphite body having a first part embedded in said wall and floor in a manner giving said body positive three dimensional constraint with respect to the crucible and a second part protruding without overhang into the molten metal bath and a thermocouple receiving recess extending completely through the embedded part and partially through the protruding part of said body in a manner leaving sufficient graphite between said recess and molten metal bath to resist the escape of molten metal for the duration of the useful life of said furnace.

12. For the melting of metals, a furnace having a molten metal bath holding crucible, and protruding without overhang into the molten metal bath from a point within the crucible and below the molten metal surface, a hollow block of graphite partially embedded in at least two interior crucible surfaces at said point and having a recess open to the exterior of said crucible for reception of a temperature responsive and measuring device, said graphite block and recess being initially proportioned to provide a wall of graphite between said recess and molten metal bath capable of constituting a barrier against escape of molten metal by way of the recess throughout the entire useful life of the furnace.

13. In a furnace for the melting of metals substantially free of graphite attacking constituents, the combination of a molten metal bath holding crucible lined with a refractory material and thermocouple reception means in the form of a hollow graphite body so secured within the crucible that one part of said body protrudes without overhang into the molten metal bath from a point within the crucible below the molten metal level while the rest of said graphite body is embedded in at least two adjacent crucible lining surfaces directed at an angle to each other to constrain said body three dimensionally at said point, said body having a recess communicating by way of a passageway through said lining with the exterior of the crucible and extending into the protruding part of said body, said recess being disposed above the line of maximum slag accumulation at the bottom of said crucible and being initially separated from the molten metal bath by a thickness of graphite such that subsequent erosion by the molten metal will not impair said thickness to where said thermocouple reception means is no longer capable of providing a barrier against escape of molten metal for the duration of the useful life of the furnace.

CARL M. ZVANUT.

References Cited in the file of this patent

UNITED STATES PATENTS

| Number | Name | Date |
| --- | --- | --- |
| 2,303,704 | Oseland | Dec. 1, 1942 |
| 2,446,637 | Crampton et al. | Aug. 10, 1948 |
| 2,519,941 | Tama | Aug. 22, 1950 |

FOREIGN PATENTS

| Number | Country | Date |
| --- | --- | --- |
| 721,087 | Germany | May 23, 1942 |